United States Patent
Li et al.

(10) Patent No.: US 11,313,521 B2
(45) Date of Patent: Apr. 26, 2022

(54) PORTABLE LIGHTING DEVICE

(71) Applicant: Nanjing Chervon Industry Co., Ltd., Nanjing (CN)

(72) Inventors: Peiyong Li, Nanjing (CN); Baofeng Fan, Nanjing (CN); Liangliang Hu, Nanjing (CN); Min Zhu, Nanjing (CN)

(73) Assignee: Nanjing Chervon Industry Co., Ltd., Nanjing (CN)

( * ) Notice: Subject to any disclaimer, the term of this patent is extended or adjusted under 35 U.S.C. 154(b) by 0 days.

(21) Appl. No.: 17/337,056

(22) Filed: Jun. 2, 2021

(65) Prior Publication Data
US 2021/0388954 A1    Dec. 16, 2021

(30) Foreign Application Priority Data

Jun. 10, 2020  (CN) .......................... 202010522028.7

(51) Int. Cl.
| | |
|---|---|
| *F21L 4/00* | (2006.01) |
| *F21L 4/02* | (2006.01) |
| *F21V 14/06* | (2006.01) |
| *F21S 9/02* | (2006.01) |
| *F21V 23/04* | (2006.01) |
| *F21Y 115/10* | (2016.01) |

(52) U.S. Cl.
CPC .................. *F21L 4/027* (2013.01); *F21S 9/02* (2013.01); *F21V 14/065* (2013.01); *F21V 23/0414* (2013.01); *F21Y 2115/10* (2016.08)

(58) Field of Classification Search
CPC ..... F21L 4/027; F21L 4/08; F21L 4/00; F21L 14/02; F21L 14/023; F21S 9/02; F21S 9/00; F21V 23/0414; F21V 14/065; F21V 14/025; F21V 23/04; F21V 23/008; F21V 23/02; F21V 23/023; F21V 33/008; F21V 33/0084
See application file for complete search history.

(56) References Cited

U.S. PATENT DOCUMENTS

| | | | |
|---|---|---|---|
| 2016/0348879 A1* | 12/2016 | Young | F21V 15/01 |
| 2019/0107259 A1* | 4/2019 | Doberstein | F21V 23/02 |
| 2020/0366110 A1* | 11/2020 | Ho | F21V 33/0052 |

* cited by examiner

*Primary Examiner* — Y M. Quach Lee
(74) *Attorney, Agent, or Firm* — Greenberg Traurig, LLP

(57) ABSTRACT

A portable lighting device includes a lighting assembly, a switch assembly, a control module, a power supply, a power recognition circuit, and a power conversion circuit. The control module is configured to control the lighting assembly to light up according to an indication of the switch assembly. The power supply is used for supplying power to the lighting assembly and includes a battery pack and an external power supply. The power conversion circuit is used for converting a power of the power supply into a power output adapted to the lighting assembly and the control module. The power recognition circuit is configured to selectively output the power of the battery pack or the power of the external power supply to the power conversion circuit.

16 Claims, 6 Drawing Sheets

PORTABLE LIGHTING DEVICE

RELATED APPLICATION INFORMATION

This application claims the benefit under 35 U.S.C. § 119(a) of Chinese Patent Application No. CN 202010522028.7, filed on Jun. 10, 2020, which is incorporated by reference in its entirety herein.

BACKGROUND

A lighting device such as a floodlight and a flashlight is used in many workplaces.

In some working conditions, the lighting device is powered by an external power supply. However, power failure may occur in a working site. The lighting device is unavailable due to the power failure of the external power supply, resulting in interruption of work. Therefore, the lighting device cannot be used in emergency situations such as power outage and disaster occurrence.

In some working conditions, the lighting device is powered by a battery pack. However, when electric quantity of the battery pack is exhausted, the battery pack needs to be recharged, resulting in the lighting device being unavailable and the interruption of work.

SUMMARY

In an example, a portable lighting device includes a housing; a lighting assembly supported by the housing; a switch assembly configured to turn on or off the portable lighting device; a control module configured to control the lighting assembly to light up according to an indication of the switch assembly; a power supply configured to supply power to the lighting assembly, wherein the power supply includes a battery pack and an external power supply; a first power interface configured to be connected to the battery pack to supply power to the lighting assembly; a second power interface configured to be connected to the external power supply to supply power to the lighting assembly; a power recognition circuit, wherein the power recognition circuit includes a first input terminal connected to the first power interface to access power of the battery pack, a second input terminal connected to the second power interface to access power of the external power supply, and an output terminal connected to the switch assembly to output power of the power supply; and a power conversion circuit configured to convert the power of the power supply into a power output adapted to the lighting assembly and the control module. The power recognition circuit is configured to selectively output the power of the battery pack or the power of the external power supply to the power conversion circuit.

In one example, in response to the external power supply being connected to the second power interface, the power recognition circuit disconnects connection between the first power interface and the power conversion circuit to output the power of the external power supply.

In one example, the power recognition circuit includes a first power supply branch comprising a capacitor connected to the first power interface, and the capacitor is configured to start being charged after the battery pack is connected to the first power interface.

In one example, the first power supply branch further includes a first switching component, one end of the first switching component is connected to the capacitor, and the first switching component is turned on after the capacitor is charged for a period of time.

In one example, the first power supply branch further includes a second switching component capable of turning on or off the connection between the first power interface and the power conversion circuit.

In one example, one end of the second switching component is connected to one end of the first switching component, and the second switching component is turned on in response to the first switching component being turned on.

In one example, the power recognition circuit includes a second power supply branch, the second power supply branch includes a third switching component, one end of the third switching component is connected to the second power interface, and the third switching component is turned on after the external power supply is connected to the second power interface.

In one example, one end of the third switching component is connected to one end of the first switching component, and the first switching component is turned off after the third switching component is turned on.

In one example, the external power supply is a direct current power supply or an alternating current power supply.

In one example, the power recognition circuit is configured to recognize a previously connected power supply and output power of the previously connected power supply.

In another example, a lighting device includes a housing; a lighting assembly supported by the housing; a switch assembly configured to turn on or off the lighting device; a control module configured to control the lighting assembly to light up according to an indication of the switch assembly; a first power interface configured to be connected to a battery pack to supply power to the lighting assembly; a second power interface configured to be connected to an external power supply to supply power to the lighting assembly; a power recognition circuit, wherein the power recognition circuit includes a first input terminal connected to the first power interface to access power of the battery pack, a second input terminal connected to the second power interface to access power of the external power supply, and an output terminal connected to the switch assembly to output power of the battery pack or the external power supply; and a power conversion circuit configured to convert the power of the battery pack or the external power supply into a power output adapted to the lighting assembly and the control module. The power recognition circuit is configured to selectively output the power of the battery pack or the power of the external power supply to the power conversion circuit.

DETAILED DESCRIPTION

Figure 1:
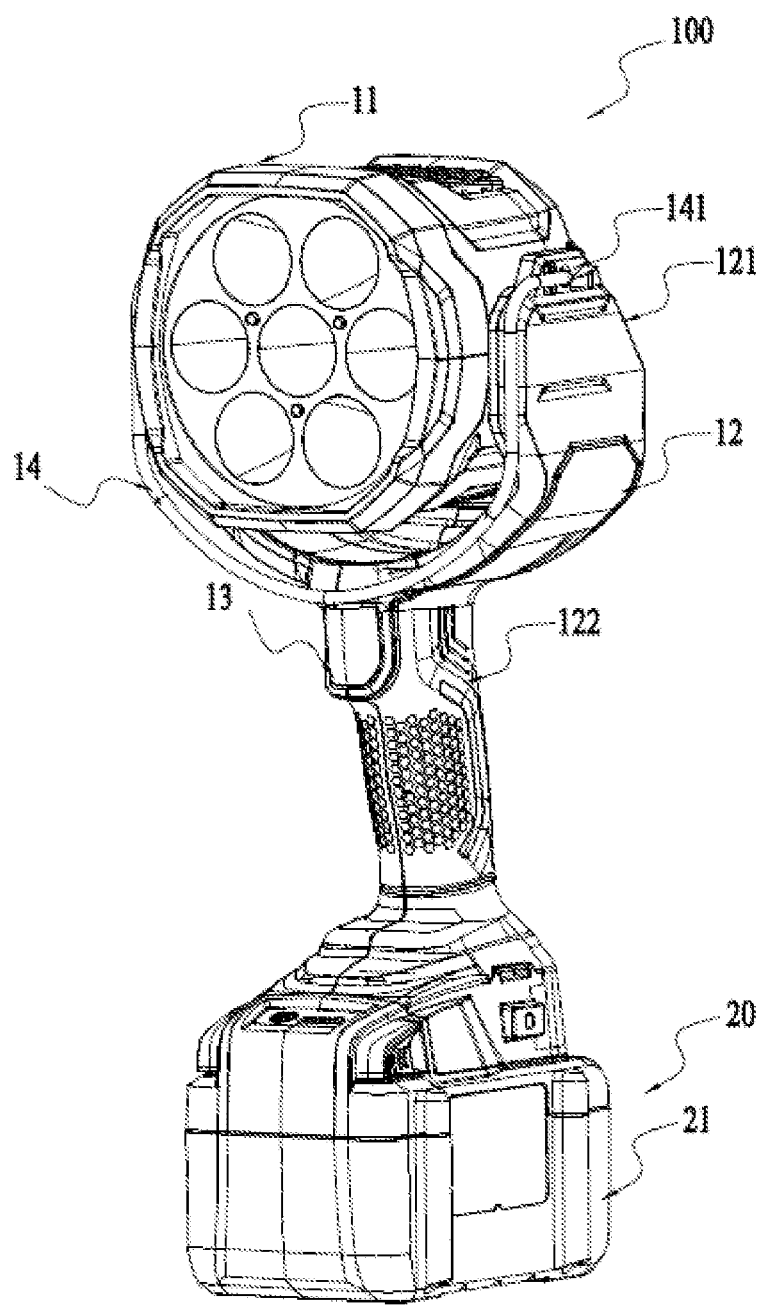
FIG. 1 is a perspective view of a portable lighting device.
Figure 2:
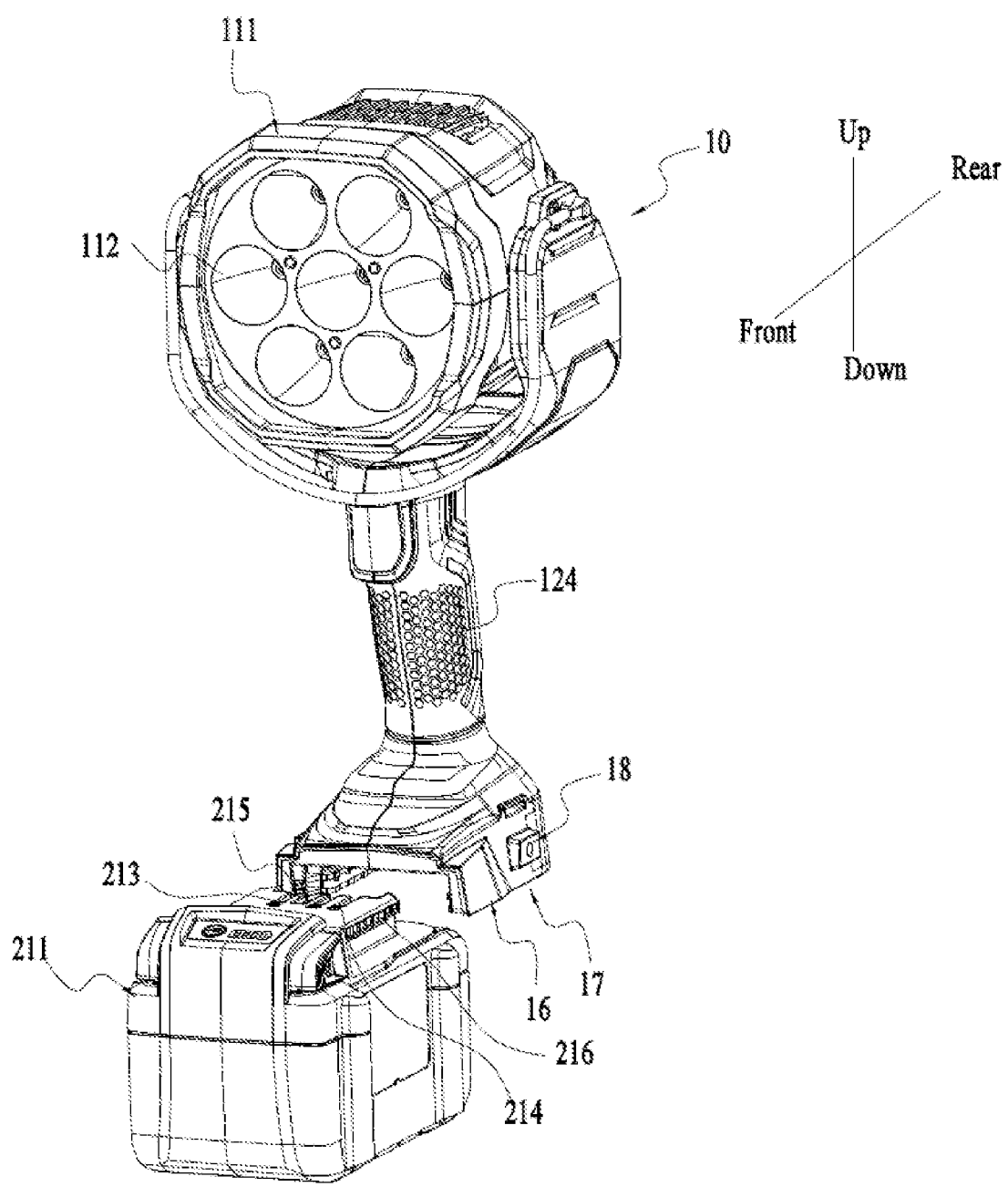
FIG. 2 is a structure view of the portable lighting device of FIG. 1 from another perspective.
Figure 3:
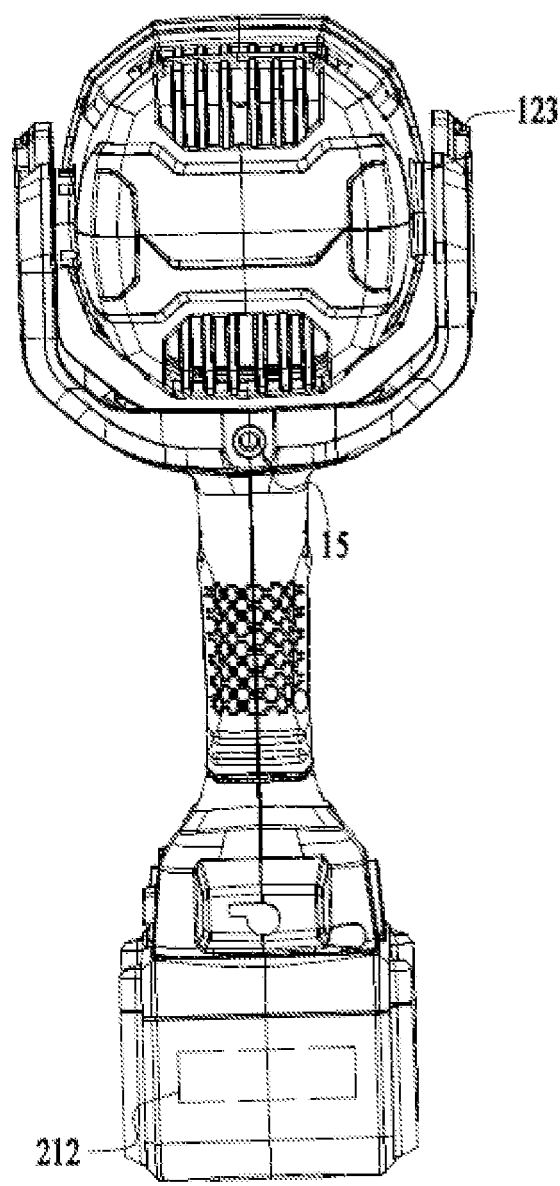
FIG. 3 is a rear view of the portable lighting device e of FIG. 1.

Referring to FIG. 1 to FIG. 3, a portable lighting device 100 includes a tool body 10 and a power supply 20. In some examples, the portable lighting device 100 is a long-range lamp. Of course, those skilled in the art will appreciate that the lighting device may also be a floodlight, a flashlight, or the like, which is not limited in the present application.

The tool body 10 includes a lighting assembly 11, a housing 12, and a switch assembly 13.

The lighting assembly 11 includes a lamp shell 111, and the lamp shell 111 provides a space to accommodate a lighting component 112. In this example, the lighting assembly 11 is configured as a surface radiator, and therefore the lighting assembly 11 has a plurality of lighting components 112. The lighting component 112 may be a light-emitting diode or a halogen light source, which is no limited herein.

The housing 12 is used for supporting the lighting assembly 11. The housing 12 includes a head portion 121 and an arm portion 122. The head portion 121 is used for supporting the lighting assembly 11 so that the lighting assembly 11 is movably connected to the housing 12. The lamp shell 111 is pivotally connected to the head portion 121 by a pivot assembly 123. The pivot assembly 123 provides a relative movement about a horizontal axis between the lamp shell 111 and the head portion 121 to further adjust an illumination direction of the lighting component 112 with respect to the arm portion 122. In this manner, the adjustment of the illumination direction can be achieved without rotating the whole portable lighting device 100, thereby improving the convenience for use.

The arm portion 122 is further provided with a handle portion 124 that can be held by a user to operate the portable lighting device 100. The handle portion 124 may be formed as a separate part or formed by the housing 12.

The switch assembly 13 is configured to turn on or off the portable lighting device 100 and is disposed at the arm portion 122. When the switch assembly 13 is pressed, the portable lighting device 100 is turned on, and when the switch assembly 13 is released, the portable lighting device 100 is turned off.

In addition, the tool body 10 further includes a handle portion 14 for moving the portable lighting device 100 back and forth, and the handle portion 14 is disposed on the housing 12. In some examples, the handle portion 14 is rotatably connected to the head portion 121 by a rotating assembly 141 so that the handle portion 14 can rotate with respect to the head portion 121. In conjunction with and referring to FIG. 2, the handle portion 14 is integrally semi-annular, two sides of the handle portion 14 are rotatably connected to two sides of the head portion 121 in a radial direction, respectively, and the handle portion 14 and the lighting assembly 11 do not interfere with each other when the handle portion 14 and the lighting assembly 11 rotate. When not in use, the handle portion 14 may be accommodated under the lighting assembly 11.

The housing 12 is further provided with a connecting component 15 configured to be connected to a tripod. The connecting component 15 is configured as a nut, and in this case, the connecting component is configured as a ¼ inch internal thread. The connecting component 15 is disposed at a rear side of the head portion 121.

In the portable lighting device 100 provided in this example, it is not necessary to rotate the whole lighting device when in use, and it is merely necessary to toggle the lighting assembly 11 to cause the lighting assembly 11 to rotate in a predetermined direction to a required angle and direction, which is convenient for use and adjustment. The portable lighting device 100 may also be connected to the tripod and suitable for various use environments and has a compact overall structure.

The power supply 20 is used for providing power for the portable lighting device 100. In some examples, the power supply 20 is the battery pack 21. For example, the battery pack 21 may be a lithium battery pack, a solid-state battery pack, or a soft-pack battery pack. In some examples, a rated voltage of the battery pack 21 is 10.8V, 24V, 36V, 48V, 56V or 80V. The battery pack 21 includes a battery pack case 211 and a battery cell group 212, and the battery pack case 211 is assembled to form an accommodating space to fix and accommodate the battery cell group 212. The battery cell group 212 includes a plurality of battery cells for storing energy, and the plurality of battery cells are connected in series, in parallel or in a combination of series and parallel arrangement to form the battery cell group 212. The battery pack 21 further includes a battery pack positive terminal 213 and a battery pack negative terminal 214 electrically connected to an external circuit.

In addition, the tool body 10 is further provided with a tool fitting portion 16 and a first power interface 17 at a lower end of the arm portion 122, and the tool fitting portion 16 and the first power interface 17 are used to be detachably connected to the battery pack. In some examples, the tool fitting portion 16 is configured such that the power supply 21 can be detached from the tool body 10 when a user slides the battery pack 21 toward the front of the tool body 10 of an electric tool. Correspondingly, the battery pack 21 is provided with a battery pack interface 215 and a battery pack fitting portion 216 adapted to the first power interface 17 and the tool fitting portion 16, and the battery pack positive terminal 213 and the battery pack negative terminal 214 are disposed in the battery pack interface 215.

In some examples, the power supply 20 may also be an external power supply 22. For example, the external power supply 22 is an alternating current power supply and cooperates with corresponding rectifying, filtering and voltage regulating circuits to implement power supply to the portable lighting device 100. The external power supply 22 may further be a vehicle-mounted power supply, and the vehicle-mounted power supply is typically a 12V direct current power supply. In order to cooperate with the external power supply 22, the portable lighting device 100 is further provided with a second power interface 18 to access the power of the external power supply 22. Specifically, the second power interface 18 is configured as a direct current (DC) circular interface with a diameter of 5.5 mm and can be connected to the vehicle-mounted power supply through a connection line. The second power interface 18 may further be connected to the alternating current power supply via an adapter. The external power supply 22 also includes a positive terminal of the external power supply 22 and a negative terminal of the external power supply 22.

Figure 4:
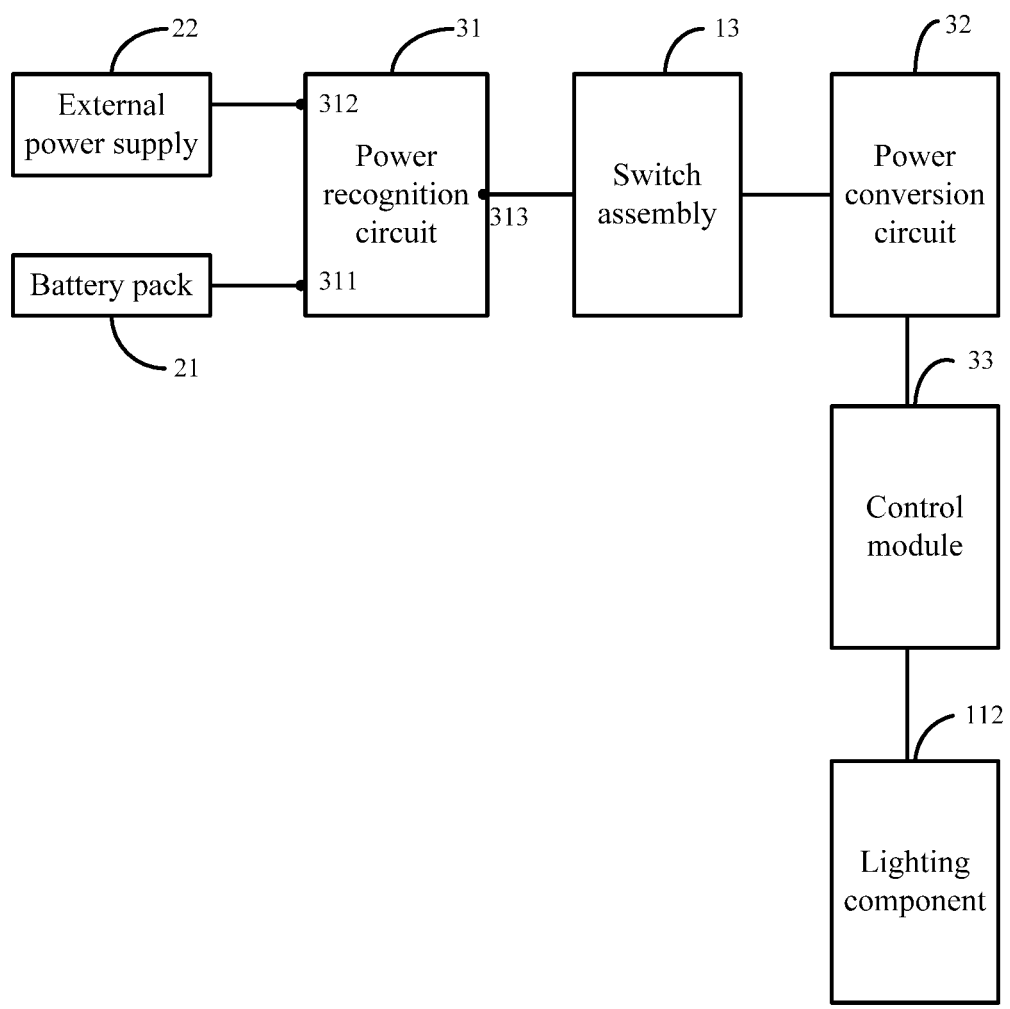
FIG. 4 is a circuit block diagram of a portable lighting device according to an example.

Referring to FIG. 4, FIG. 4 illustrates a circuit block diagram of a portable lighting device 100 according to an example. The portable lighting device 100 further includes a power recognition circuit 31, a power conversion circuit 32 and a control module 33.

The control module 33 is connected to the lighting assembly 11 and used for controlling the lighting component 112 of the lighting assembly 11 to turn on according to an indication from the switch assembly 13. In some examples, the control module 33 is capable of controlling a working mode of the portable lighting device 100 according to the indication from the switch assembly 13, for example, a hard-light mode, that is, all lighting components are lit, and a low-light mode, that is, part of the lighting components are lit. In some examples, the control module 33 adopts a specified control chip, such as a microcontroller unit (MCU).

The power conversion circuit 32 is used for converting the power of the power supply 20 into a power output adapted to the lighting assembly 11 and the control module 33 to supply power to the lighting assembly 11 and the control module 33. In some examples, the power conversion circuit 32 includes one or more direct current to direct current (DC-DC) conversion chips.

The power recognition circuit 31 is connected to the first power interface 17 and the second power interface 18, and the power recognition circuit 31 is connected to the power conversion circuit 32. Specifically, the power recognition circuit 31 includes a first input terminal 311, a second input terminal 312, and an output terminal 313. The first input terminal 311 is connected to the first power interface 17 to access the power of the battery pack 21, the second input terminal 312 is connected to the second power interface 18 to access the power of the external power supply 22, and the output terminal 313 of the power recognition circuit 31 is connected to the switch assembly 13. Therefore, the portable lighting device 100 can access both the power of the battery pack 21 and the power of the external power supply 22, and the power recognition circuit 31 can selectively output the power of the battery pack 21 or the power of the external power supply 22 to the power conversion circuit 32 to supply the power to the lighting assembly 11 and the control module 33.

Figure 5:
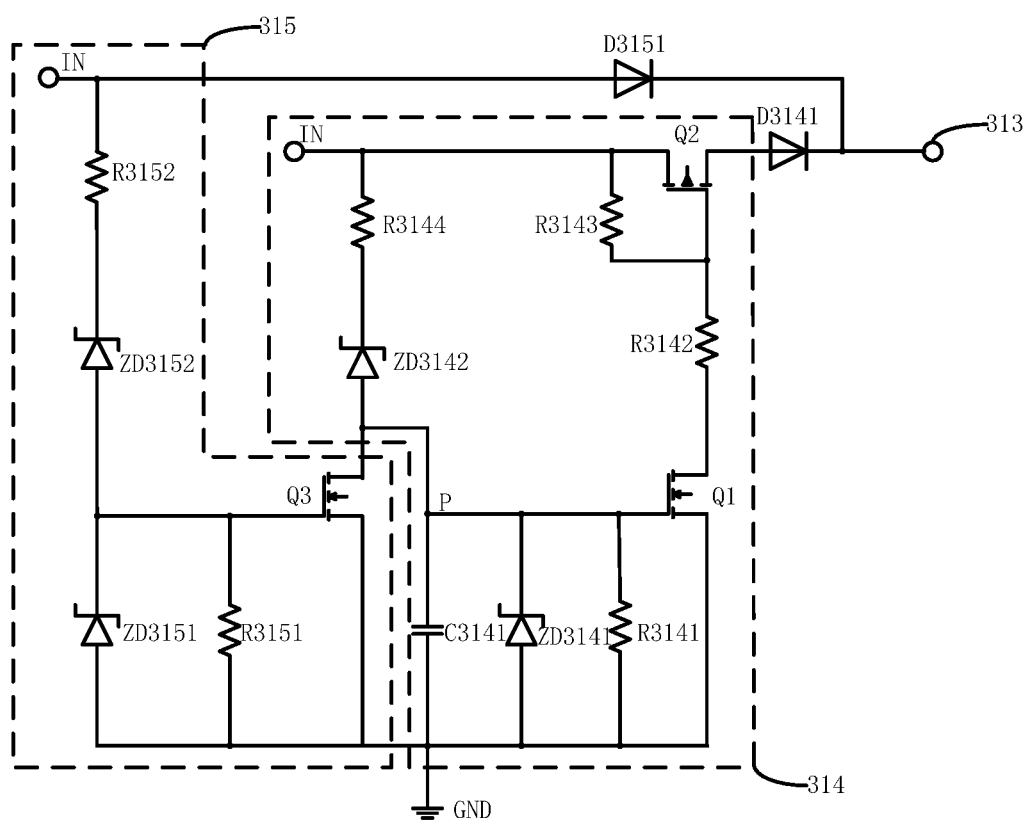
FIG. 5 is a circuit diagram of a power recognition circuit of the portable lighting device of FIG. 4 according to an example.

In an implementation of the power recognition circuit 31, referring to FIG. 5, when the external power supply 22 is connected to the second power interface 18, the power recognition circuit 31 disconnects the connection between the first power interface 17 and the power conversion circuit 32, that is, the connection between the battery pack 21 and the power conversion circuit 32 is disconnected so that the external power supply 22 supplies power to the portable lighting device 100.

Specifically, the power recognition circuit 31 includes a first power supply branch 314, the first power supply branch 314 includes a capacitor C3141, a first switching component Q1 and a second switching component Q2, and these electronic components are associated and connected to jointly form the first power supply branch 314.

An input terminal IN of the first power supply branch 314 is used for being connected to the battery pack positive terminal 213. A first resistor R3141 and a first Zener diode ZD3141 are connected in parallel to a gate G and a source S of the first switching component Q1, and the source S and a drain D of the first switching component Q1 are respectively connected to the ground GND and a gate G of the second switching component Q2. A second resistor R3142 is connected in series between the drain D of the first switching component Q1 and the gate G of the second switching component Q2. A source S of the second switching component Q2 is connected to the input terminal IN of the first power supply branch 314, a drain D of the second switching component Q2 is connected to one end of a first diode D3141, and another end of the first diode D3141 is connected to the output terminal 313 of the power recognition circuit 31. A third resistor R3143 is connected to the gate G and the drain D of the second switching component Q2. One end of the capacitor C3141 is connected to the gate G of the first switching component Q1, and another end of the capacitor C3141 is connected to the ground GND. One end of a second Zener diode ZD3142 is connected to one end of the capacitor C3141, and another end of the second Zener diode ZD3142 is connected to a fourth resistor R3144. The fourth resistor R3144 is connected in series between the input terminal IN of the first power supply branch 314 and the second Zener diode ZD3142.

In this manner, after the battery pack 21 is plugged into the first power interface 17, the capacitor C3141 starts being charged. A voltage at a terminal P of the capacitor C3141 gradually increases, and after the capacitor C3141 is charged for a period of time, the first switching component Q1 is turned on, so that the gate G of the second switching component Q2 is connected to the ground GND and the second switching component Q2 is turned on. In this manner, the second switching component Q2 turns on the connection between the first power interface 17 and the power conversion circuit 32, so that the battery pack supplies power to the portable lighting device 100.

The power recognition circuit 31 further includes a second power supply branch 315. The second power supply branch 315 includes a third switching component Q3 and other electronic components connected to the third switching component Q3.

The input terminal IN of the second power supply branch 315 is connected to the positive terminal of the external power supply 22. A third Zener diode ZD3151 and a fifth resistor R3151 are connected in parallel to a gate G and a source S of the third switching component Q3, the source S of the third switching component Q3 is connected to the ground GND, and a drain D of the third switching component Q3 is connected to one end of the capacitor C3141. One end of a fourth Zener diode ZD3152 is connected to the third Zener diode ZD3451, another end of the fourth Zener diode ZD3152 is connected to one end of a sixth resistor R3152, and another end of the sixth resistor R3152 is connected to the input terminal IN of the second power supply branch 315. A second diode D3151 is connected in series between the input terminal IN of the second power supply branch 315 and the output terminal 313 of the power recognition circuit 31.

In this manner, after the external power supply 22 is connected to the second power interface 18, a voltage of the gate G of the third switching component Q3 is pulled up and the third switching component Q3 is turned on so that a voltage of the gate G of the first switching component Q1 is pulled down, the first switching component Q1 is turned off, and the second switching component Q2 is turned off. Therefore, the second switching component Q2 disconnects the connection between the first power interface 17 and the power conversion circuit 32, the battery pack 21 is prohibited from supplying power to the portable lighting device 100, and the external power supply 22 supplies power to the portable lighting device 100 through the second diode D3151.

In a case where the battery pack 21 and the external power supply 22 are both connected to the portable lighting device 100, the third switching component Q3 is firstly turned on due to the presence of the capacitor C3141, so that the voltage of the gate G of the first switching component Q1 is pulled down, the first switching component Q1 is turned off, and the second switching component Q2 is turned off. Therefore, the second switching component Q2 disconnects the connection between the first power interface 17 and the power conversion circuit 32, the battery pack 21 is prohibited from supplying power to the portable lighting device 100, and the external power supply 22 supplies power to the portable lighting device 100 through the second diode D3151.

The first power supply branch 314 and the second power supply branch 315 for turning on or off the connection between the first power interface 17 and the power conversion circuit 32 are provided so that the external power supply 22 is compatible with the battery pack 21 in the portable lighting device 100 to supply power. When the portable lighting device 100 is connected to the external power supply 22, the power recognition circuit 31 disconnects the connection between the first power interface 17 and the power conversion circuit 32 and selects the external power supply 22 to supply power to the portable lighting device 100, thereby saving the power of the battery pack and further expanding usage scenarios of the lighting device.

It is to be understood that the portable lighting device 100 may further be configured to recognize a previously connected power supply 20 and then use the previously connected power supply 20 to provide power.

Figure 6:
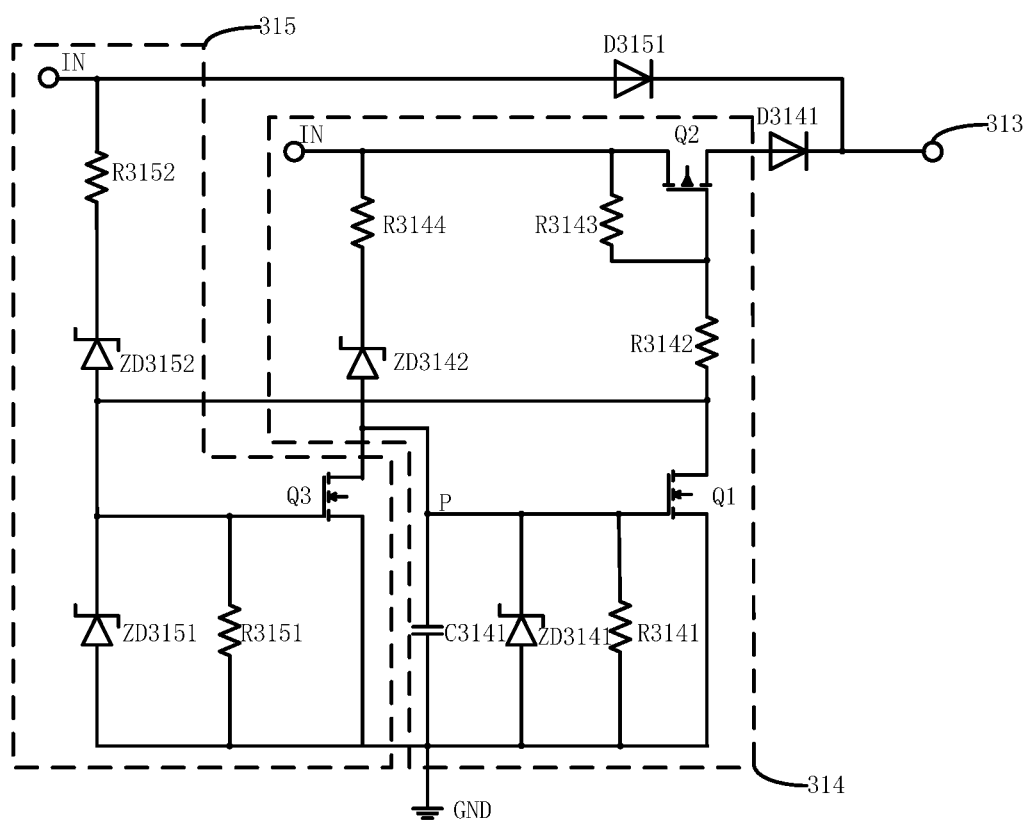
FIG. 6 is a circuit diagram of a power recognition circuit of the portable lighting device of FIG. 4 according to another example.

In an implementation of the power recognition circuit 31, referring to FIG. 6, the circuit differs from the circuit of the example shown in FIG. 5 in that one end of the first switching component Q1 is directly connected to one end of the third switching component Q3.

In this manner, after the battery pack 21 is firstly plugged into the first power interface 17, the capacitor C3141 starts being charged. A voltage at a terminal P of the capacitor C3141 gradually increases, and after the capacitor C3141 is charged for a period of time, the first switching component Q1 is turned on, so that the gate G of the second switching component Q2 is connected to the ground, the second switching component Q2 is turned on, and the battery pack 21 supplies power to the portable lighting device. Then, when the portable lighting device 100 is connected to the external power supply 22, the third switching component Q3 is turned off since the connection between the gate G of the third switching component Q3 and the ground GND is turned on. Thus, the first switching component Q1 and the second switching component Q2 remain turned on. When the voltage of the battery pack 21 is greater than the voltage of the external power supply 22, the battery pack continues to supply power to the portable lighting device 100.

When the external power supply 22 is firstly connected to the second power interface 18, the voltage of the gate G of the third switching component Q3 is pulled up and the third switching component Q3 is turned on so that the voltage of the gate G of the first switching component Q1 is pulled down, the first switching component Q1 is turned off, and the second switching component Q2 is turned off. Therefore, the second switching component Q2 disconnects the connection between the first power interface 17 and the power conversion circuit 32, the battery pack 21 is prohibited from supplying power to the portable lighting device 100, and the external power supply 22 supplies power to the portable lighting device 100 through the second diode D3151.

However, in a case where the battery pack 21 and the external power supply 22 are both connected to the portable lighting device 100, the third switching component Q3 is firstly turned on due to the presence of the capacitor C3141, so that the voltage of the gate G of the first switching component Q1 is pulled down, the first switching component Q1 is turned off, and the second switching component Q2 is turned off. Therefore, the second switching component Q2 disconnects the connection between the first power interface 17 and the power conversion circuit 32, the battery pack is prohibited from supplying power to the portable lighting device 100, and the external power supply 22 supplies power to the portable lighting device 100 through the second diode D3151.

The first power supply branch 314 and the second power supply branch 315 for turning on or off the connection between the first power interface 17 and the power conversion circuit 32 are provided so that the external power supply 22 is compatible with the battery pack 21 in the portable lighting device 100 to supply power. When the portable lighting device 100 is connected to the external power supply 22 and the battery pack 21 successively, the firstly connected power supply 20 is selected to supply power to the portable lighting device 100; and when the portable lighting device 100 is connected to both the external power supply 22 and the battery pack 21, the external power supply 22 is selected to supply power to the portable lighting device 100, thereby saving the power of the battery pack 21 and further expanding usage scenarios of the portable lighting device 100.

The above illustrates and describes basic principles, main features and advantages of the invention hereinafter claimed. It is to be understood by those skilled in the art that the above examples do not limit the claimed invention in any form, and technical solutions obtained by means of equivalent substitution or equivalent transformation fall within the scope of the claimed invention.

What is claimed is:

1. A portable lighting device, comprising:
    a housing;
    a lighting assembly supported by the housing;
    a switch assembly;
    a control module configured to control the lighting assembly to light up according to an indication of the switch assembly;
    a power supply configured to supply a power to the lighting assembly comprising a battery pack and an external power supply;
    a first power interface configured to be connected to the battery pack;
    a second power interface configured to be connected to the external power supply;
    a power recognition circuit comprising a first input terminal connected to the first power interface, a second input terminal connected to the second power interface, and an output terminal connected to the switch assembly to output the power of the power supply; and
    a power conversion circuit configured to convert the power of the power supply into a power output adapted to the lighting assembly and the control module,
    wherein the power recognition circuit is configured to selectively output a power of the battery pack or a power of the external power supply to the power conversion circuit,
    wherein, in response to the external power supply being connected to the second power interface, the power recognition circuit disconnects a connection between the first power interface and the power conversion circuit to output the power of the external power supply, and
    wherein the power recognition circuit comprises a first power supply branch comprising a capacitor connected to the first power interface and the capacitor is configured to start being charged after the battery pack is connected to the first power interface.

2. The portable lighting device of claim 1, wherein the first power supply branch further comprises a first switching component, one end of the first switching component is connected to the capacitor, and the first switching component is turned on after the capacitor is charged for a period of time.

3. The portable lighting device of claim 2, wherein the first power supply branch further comprises a second switching component capable of turning on or off the connection between the first power interface and the power conversion circuit.

4. The portable lighting device of claim 3, wherein one end of the second switching component is connected to one end of the first switching component and the second switching component is turned on in response to the first switching component being turned on.

5. The portable lighting device of claim 4, wherein the power recognition circuit comprises a second power supply branch, the second power supply branch comprises a third switching component, one end of the third switching component is connected to the second power interface, and the third switching component is turned on after the external power supply is connected to the second power interface.

6. The portable lighting device of claim 5, wherein one end of the third switching component is connected to one end of the first switching component and the first switching component is turned off after the third switching component is turned on.

7. The portable lighting device of claim 1, wherein the external power supply is a direct current power supply or an alternating current power supply.

8. The portable lighting device of claim 1, wherein the power recognition circuit is configured to recognize a previously connected power supply and output a power of the previously connected power supply.

9. A lighting device, comprising:
   a housing;
   a lighting assembly supported by the housing;
   a switch assembly;
   a control module configured to control the lighting assembly to light up according to an indication of the switch assembly;
   a first power interface configured to be connected to a battery pack;
   a second power interface configured to be connected to an external power supply;
   a power recognition circuit comprising a first input terminal connected to the first power interface, a second input terminal connected to the second power interface, and an output terminal connected to the switch assembly to output a power of the battery pack or a power of the external power supply; and
   a power conversion circuit configured to convert the power of the battery pack or the power of the external power supply into a power output adapted to the lighting assembly and the control module,
   wherein the power recognition circuit is configured to selectively output the power of the battery pack or the power of the external power supply to the power conversion circuit,
   wherein, in response to the external power supply being connected to the second power interface, the power recognition circuit disconnects a connection between the first power interface and the power conversion circuit to output the power of the external power supply, and
   wherein the power recognition circuit comprises a first power supply branch comprising a capacitor connected to the first power interface and the capacitor is configured to start being charged after the battery pack is connected to the first power interface.

10. The lighting device of claim 9, wherein the first power supply branch further comprises a first switching component, one end of the first switching component is connected to the capacitor, and the first switching component is turned on after the capacitor is charged for a period of time.

11. The lighting device of claim 10, wherein the first power supply branch further comprises a second switching component capable of turning on or off the connection between the first power interface and the power conversion circuit.

12. The lighting device of claim 11, wherein one end of the second switching component is connected to one end of the first switching component and the second switching component is turned on in response to the first switching component being turned on.

13. The lighting device of claim 12, wherein the power recognition circuit comprises a second power supply branch, the second power supply branch comprises a third switching component, one end of the third switching component is connected to the second power interface, and the third switching component is turned on after the external power supply is connected to the second power interface.

14. The lighting device of claim 13, wherein one end of the third switching component is connected to one end of the first switching component and the first switching component is turned off after the third switching component is turned on.

15. The lighting device of claim 9, wherein the external power supply is a direct current power supply or an alternating current power supply.

16. The lighting device of claim 9, wherein the power recognition circuit is configured to recognize a previously connected one of the battery pack or the external power supply and output a power of the previously connected one.

* * * * *